United States Patent
Ikeda et al.

(10) Patent No.: US 6,804,183 B2
(45) Date of Patent: Oct. 12, 2004

(54) ROTATION CONTROL METHOD FOR CONTROLLING ROTATION OF MEDIA HAVING ZONES IN RADIAL DIRECTION AND EMPLOYING ZCAV SYSTEM, AND STORAGE APPARATUS USING THE ROTATION CONTROL METHOD

(75) Inventors: Toru Ikeda, Kawasaki (JP); Shigenori Yanagi, Kawasaki (JP); Miyozo Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 272 days.

(21) Appl. No.: 09/800,553

(22) Filed: Mar. 7, 2001

(65) Prior Publication Data

US 2002/0041548 A1 Apr. 11, 2002

(30) Foreign Application Priority Data

Sep. 29, 2000 (JP) .................................. 2000-301461

(51) Int. Cl.$^7$ ................................................ G11B 7/00
(52) U.S. Cl. ................ 369/53.37; 369/53.3; 369/60.01; 369/275.3
(58) Field of Search ............................... 369/116, 60.01, 369/53.18, 14, 275.3, 239, 53.37

(56) References Cited

U.S. PATENT DOCUMENTS

| | | | | |
|---|---|---|---|---|
| 5,453,972 A | * | 9/1995 | Kanawa et al. | 369/219 |
| 5,751,671 A | * | 5/1998 | Koike et al. | 369/14 |
| 5,780,982 A | * | 7/1998 | Tagiri | 318/254 |
| 5,953,300 A | * | 9/1999 | Serizawa et al. | 369/60 |
| 6,052,347 A | * | 4/2000 | Miyata | 369/54 |
| 6,201,784 B1 | * | 3/2001 | Maeda | 369/275.3 |
| 6,219,321 B1 | * | 4/2001 | Serizawa et al. | 369/59 |
| 6,310,848 B1 | * | 10/2001 | Ueki | 369/53.37 |
| 6,515,948 B1 | * | 2/2003 | Sakamoto | 369/47.32 |

FOREIGN PATENT DOCUMENTS

| | | | |
|---|---|---|---|
| JP | 6370964 | * | 3/1988 |
| JP | 5041046 | * | 2/1993 |
| JP | 6162670 | * | 6/1994 |
| JP | 7161042 | * | 6/1995 |
| JP | 7262686 | * | 10/1995 |
| JP | 10124879 | * | 5/1998 |
| JP | 10143994 | * | 5/1998 |
| JP | 10320908 | * | 12/1998 |
| JP | 11073669 | * | 3/1999 |
| JP | 2000-339729 | * | 12/2000 |

* cited by examiner

*Primary Examiner*—Gautam R. Patel
(74) *Attorney, Agent, or Firm*—Greer, Burns & Crain, Ltd.

(57) ABSTRACT

A storage apparatus has a function of controlling rotation of a recording medium which is divided into a plurality of zones in a radial direction thereof and employing a ZCAV system. The storage apparatus is provided with a setting part for setting a mode to one of a normal mode in which the recording medium is controlled to rotate at a first rotational speed, and a high-speed mode in which the recording medium is controlled to rotated at a plurality of second rotational speeds respectively corresponding to a plurality of areas to which the recording medium is divided in the radial direction thereof.

20 Claims, 13 Drawing Sheets

FIG.3

| ZONE | | ZCAV 3637rpm | 4138rpm | (Kbyte/s) 5001rpm |
|---|---|---|---|---|
| OUTER PERIPHERY | 0 | 5090 | | |
| | 1 | 4966 | | |
| | 2 | 4842 | | |
| | 3 | 4717 | | |
| | 4 | 4593 | | |
| | 5 | 4469 | 5085 | |
| | 6 | 4345 | 4944 | |
| | 7 | 4221 | 4802 | |
| | 8 | 4097 | 4661 | |
| | 9 | 3973 | 4520 | |
| | 10 | 3848 | 4379 | |
| | 11 | 3724 | 4237 | 5121 |
| | 12 | 3600 | 4096 | 4950 |
| | 13 | 3476 | 3955 | 4780 |
| | 14 | 3352 | 3814 | 4609 |
| | 15 | 3228 | 3672 | 4438 |
| | 16 | 3104 | 3531 | 4268 |
| INNER PERIPHERY | 17 | 2979 | 3390 | 4097 |

FIG. 7

|  | 3637rpm | 4138rpm | 5001rpm |
|---|---|---|---|
| 0 | 80.34 | - | - |
| 1 | 78.38 | - | - |
| 2 | 76.42 | - | - |
| 3 | 74.46 | - | - |
| 4 | 72.5 | - | - |
| 5 | 70.55 | 80.28 | - |
| 6 | 68.59 | 78.05 | - |
| 7 | 66.63 | 75.82 | - |
| 8 | 64.67 | 73.59 | - |
| 9 | 62.71 | 71.36 | - |
| 10 | 60.75 | 69.13 | - |
| 11 | 58.79 | 66.9 | 80.83 |
| 12 | 56.83 | 64.67 | 78.11 |
| 13 | 54.87 | 62.44 | 75.44 |
| 14 | 52.91 | 60.21 | 72.75 |
| 15 | 50.95 | 57.98 | 70.06 |
| 16 | 48.99 | 55.75 | 67.36 |
| 17 | 47.03 | 53.52 | 64.67 |

FIG.11

| ZONE | | ZCAV 3637rpm | 4138rpm | (Kbyte/s) 5001rpm |
|---|---|---|---|---|
| OUTER PERIPHERY | 0 | 5090 | | |
| | 1 | 4966 | | |
| | 2 | 4842 | | |
| | 3 | 4717 | | |
| | 4 | 4593 | | |
| | 5 | 4469 | 5085 | |
| | 6 | 4345 | 4944 | |
| | 7 | 4221 | 4802 | |
| | 8 | 4097 | 4661 | |
| | 9 | 3973 | 4520 | |
| | 10 | 3848 | 4379 | |
| | 11 | 3724 | 4237 | 5121 |
| | 12 | 3600 | 4096 | 4950 |
| | 13 | 3476 | 3955 | 4780 |
| | 14 | 3352 | 3814 | 4609 |
| | 15 | 3228 | 3672 | 4438 |
| | 16 | 3104 | 3531 | 4268 |
| INNER PERIPHERY | 17 | 2979 | 3390 | 4097 |

… …

ROTATION CONTROL METHOD FOR CONTROLLING ROTATION OF MEDIA HAVING ZONES IN RADIAL DIRECTION AND EMPLOYING ZCAV SYSTEM, AND STORAGE APPARATUS USING THE ROTATION CONTROL METHOD

BACKGROUND OF THE INVENTION

This application claims the benefit of a Japanese Patent Application No.2000-301461 filed Sep. 29, 2000, in the Japanese Patent Office, the disclosure of which is hereby incorporated by reference.

1. Field of the Invention

The present invention generally relates to rotation control methods for recording media and storage apparatuses, and more particularly to a rotation control method for controlling rotation of a recording medium such as an optical disk, and to a storage apparatus which employs such a rotation control method.

Recording media such as optical disks employ a zone constant angular velocity (ZCAV) system or a zone constant linear velocity (ZCLV) system. When the ZCAV system is employed, it is possible to obtain a high random access performance with respect to the recording medium, but a recording and/or reproducing clock frequency becomes low. For example, a data transfer rate at an inner periphery of the optical disk becomes slow. On the other hand, when the ZCLV system is employed, it is possible to obtain a high data transfer rate, but the random access performance with respect to the recording medium becomes poor because the rotational speed of the recording medium such as the optical disk changes upon access thereto.

2. Description of the Related Art

Recently, due to the popular use of the Internet, there are increased opportunities for users to download data, such as music and video data, via a communication line or the like, and to record the downloaded data in recording media. In such cases, magnetic disks of a hard disk drive (HDD), and removable optical disks such as a digital versatile disk random access memory (DVD-RAM) are used as the recording media.

In the case of the video data, the size of one file is relatively large. In addition, the video data is a continuous data, and it is necessary to continuously and stably maintain the data transfer rate over a predetermined value during recording to or reproduction from the optical disk, in order not to generate an image distortion such as frame dropout.

On the other hand, in personal computers or the like, a disk management area is usually provided in a portion of the optical disk for the purposes of managing programs and files. Accordingly, it becomes necessary to access the disk management area every time an access is made to the program or file. For this reason, in a case where the size of each file is relatively small, the access to the file and the access to the disk management area are repeated, to thereby generate a random access to the optical disk.

Therefore, the required data transfer rate and the required random access performance differ depending on the state of use of the recording medium, such as the kind of data processed, the file size and the usage of the recording medium.

Conventionally, there was a problem in that the data transfer rate and the random access performance cannot be set appropriately depending on the state of use of the recording medium, such as the kind of data processed, the file size and the usage of the recording medium.

SUMMARY OF THE INVENTION

Accordingly, it is a general object of the present invention to provide a novel and useful rotation control method and storage apparatus, in which the problems described above are eliminated.

Another and more specific object of the present invention is to provide a rotation control method and a storage apparatus which can set a data transfer rate and a random access performance to optimum values depending on a state of use of a recording medium.

Still another object of the present invention is to provide a rotation control method for controlling a recording medium which is divided into a plurality of zones in a radial direction thereof and employing a ZCAV system, where the rotation control method comprises the step of (a) switching a mode between a normal mode in which the recording medium is controlled to rotate at a first rotational speed, and a high-speed mode in which the recording medium is controlled to rotated at a plurality of second rotational speeds respectively corresponding to a plurality of areas to which the recording medium is divided in the radial direction thereof. According to the rotation control method of the present invention, it is possible to set a data transfer rate and a random access performance to optimum values depending on a state of use of the recording medium.

A further object of the present invention is to provide a storage apparatus having a function of controlling rotation of a recording medium which is divided into a plurality of zones in a radial direction thereof and employing a ZCAV system, comprising a setting part setting a mode to one of a normal mode in which the recording medium is controlled to rotate at a first rotational speed, and a high-speed mode in which the recording medium is controlled to rotated at a plurality of second rotational speeds respectively corresponding to a plurality of areas to which the recording medium is divided in the radial direction thereof. According to the storage apparatus of the present invention, it is possible to set a data transfer rate and a random access performance to optimum values depending on a state of use of the recording medium.

Another object of the present invention is to provide a storage apparatus having a function of controlling rotation of a recording medium which is divided into a plurality of zones in a radial direction thereof and employing a ZCAV system, comprising a controller switching and controlling a rotational speed of the recording medium in a plurality of stages when making an access from an arbitrary one of a plurality of areas to which the recording medium is divided in the radial direction to an area located on an inner peripheral side or an outer peripheral side of the recording medium relative to the arbitrary area, so that a data transfer rate becomes 3700 Kbyte/s or greater when making the access to the area located on the inner peripheral side of the recording medium relative to the arbitrary area. According to the storage apparatus of the present invention, it is possible to set a data transfer rate and a random access performance to optimum values depending on a state of use of the recording medium.

Other objects and further features of the present invention will be apparent from the following detailed description when read in conjunction with the accompanying drawings.

BRIEF DESCRIPTION OF THE DRAWINGS

FIG. 3 is a diagram showing the relationships of a zone on an optical disk, a data transfer rate and a rotational speed of the optical disk;

FIG. 7 is a diagram showing the relationships of the zone on the optical disk, a recording or reproducing clock frequency and the rotational speed of the optical disk;

FIG. 11 is a diagram for explaining a buffer region provided on the optical disk;

DESCRIPTION OF THE PREFERRED EMBODIMENTS

Figure 1:
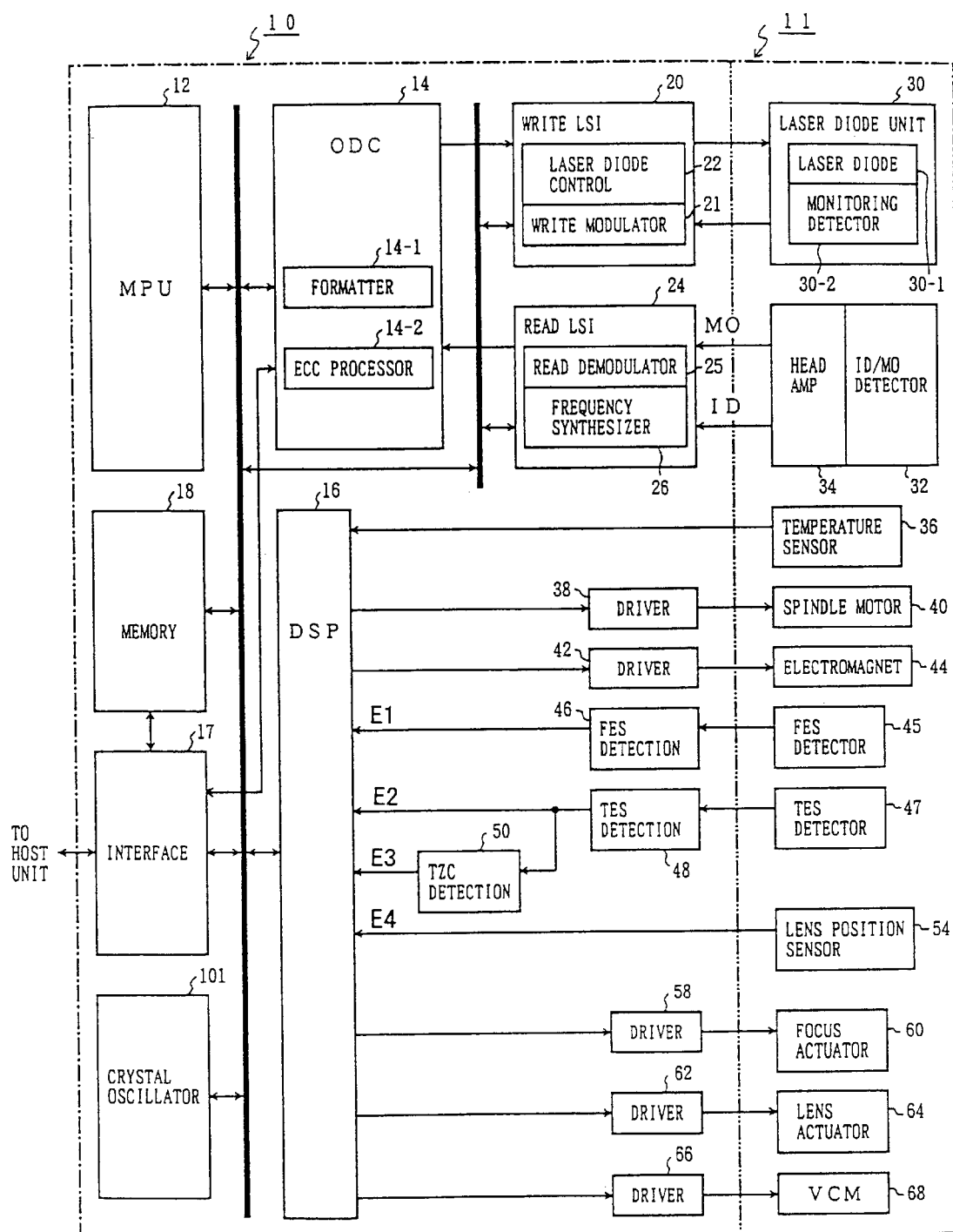
FIG. 1 is a system block diagram showing the construction of a first embodiment of a storage apparatus according to the present invention.

A description will be given of embodiments of a rotation control method for recording medium according to the present invention and a storage apparatus according to the present invention, by referring to the drawings.

First, a description will be given of a first embodiment of the storage apparatus according to the present invention, by referring to FIGS. 1 and 2. FIG. 1 is a system block diagram showing the construction of this first embodiment of the storage apparatus. In this first embodiment of the storage apparatus, the present invention is applied to an optical disk unit. In addition, this first embodiment of the storage apparatus employs a first embodiment of the rotation control method for recording medium according to the present invention.

As shown in FIG. 1, the optical disk unit generally includes a control unit 10 and an enclosure 11. The control unit 10 includes a microprocessor unit (MPU) 12 which generally controls the operation of the optical disk unit, an interface 17 which exchanges commands and data between a host unit (not shown), an optical disk controller (ODC) 14 which carries out processes required to read and write data with respect to an optical disk (not shown), a digital signal processor (DSP) 16, and a memory 18. The memory 18 is used in common by the MPU 12, the ODC 14 and the interface 14, and for example, includes a dynamic random access memory (DRAM), a nonvolatile memory which stores control programs and flag information, or the like. A crystal oscillator 101 is coupled to the MPU 12.

The ODC 14 includes a formatter 14-1 and an error correction code (ECC) processor 14-2. At the time of a write access, the formatter 14-1 divides NRZ write data into sector units of the optical disk and generates a recording format, and the ECC processor 14-2 generates and adds an ECC with respect to sector write data units and also generates and adds if necessary a cyclic redundancy check (CRC) code. Further, the ECC processor 14-2 converts the sector data with the encoded ECC into a 1-7 run length limited (RLL) code, for example.

At the time of a read access, a reverse conversion of the 1-7 RLL is carried out with respect to the sector data, and after carrying out the CRC, the error detection and error correction using the ECC are carried out in the ECC processor 14-2. Further, the NRZ data in sector units are connected in the formatter 14-1 so as to transfer a NRZ read data stream to the host unit.

A write large scale integrated (LSI) circuit 20 is provided with respect to the ODC 14. This write LSI circuit 20 includes a write modulator 21 and a laser diode control circuit 22. A control output of the laser diode control circuit 22 is supplied to a laser diode unit 30 which is provided in an optical unit of the enclosure 11. The laser diode unit 30 integrally includes a laser diode 30-1 and a monitoring detector 30-2. The write modulator 21 converts the write data into the data format of the pit position modulation (PPM) recording (or mark recording) or, a pulse width modulation (PWM) recording (or edge recording).

When recording and reproducing data with respect to the optical disk using the laser diode unit 30, this embodiment uses a writable magneto-optical (MO) cartridge medium employing the PWM recording which records the data in correspondence with the existence of mark edges on the optical disk. In addition, the recording format used by the optical disk is a 1.3 GB format using magnetic super resolution (MSR) and the ZCAV system. When the optical disk is loaded into the optical disk unit, an identification (ID) portion of the optical disk is first read, so as to recognize the type (storage capacity and the like) of the optical disk in the MPU 12 based on pit intervals of the ID portion. The MPU 12 notifies the recognition result indicating the type of optical disk to the ODC 14.

A read LSI circuit 24 is provided as a read system with respect to the ODC 14. A read demodulator 25 and a frequency synthesizer 26 are provided in the read LSI circuit 24. An ID/MO detector 32 of the enclosure 11 detects a laser beam emitted from the laser diode 30-1 and returned via the optical disk, and a detection signal from this ID/MO detector 32 is input as an ID signal and a MO signal to the read LSI circuit 24 via a head amplifier 34.

The read demodulator 25 of the read LSI circuit 24 includes the functions of circuits such as an automatic gain control (AGC) circuit, a filter and a sector mark detection circuit. Hence, the read demodulator 25 generates a read clock and read data from the input ID signal and MO signal, and demodulates the PWM data back into the original NRZ data. In addition, since the ZCAV system is employed, the MPU 12 controls a setting of a frequency dividing ratio with respect to the frequency synthesizer 26 of the read LSI circuit 24 in order to generate a clock frequency in correspondence with the zone.

The frequency synthesizer 26 is a phase locked loop (PLL) circuit having a programmable frequency divider, and generates as a read clock a reproducing reference clock having a predetermined specific frequency depending on the zone position on the optical disk. In other words, the frequency synthesizer 26 is formed by the PLL circuit having the programmable frequency divider, and in a normal mode, generates the recording and/or reproducing reference clock having a frequency fo based on fo=(m/n)fi according to a frequency dividing ratio m/n which is set by the MPU 12 depending on a zone number.

A denominator n of the frequency dividing ratio m/n is a specific value depending on the type of optical disk. In addition, a numerator m of the frequency dividing ratio m/n is a value which changes depending on the zone position on the optical disk, and table information of the values corresponding to the zone numbers are prepared in advance with respect to each type of optical disk. Moreover, fi denotes a recording and/or reproducing reference clock frequency generated outside the frequency synthesizer 26.

The read data demodulated in the read LSI circuit 24 is supplied to the read system of the ODC 14, and after carrying out the reverse conversion of the 1-7 RLL, the CRC and the ECC processes are carried out by the encoding function of the ECC processor 14-2 so as to restore the original NRZ data. Next, the formatter 14-1 connects and converts the NRZ sector data into the NRZ data stream, and this NRZ read data stream is transferred to the host unit via the memory 18 and the interface 17.

A detection signal from a temperature sensor 36 provided in the enclosure 11 is supplied with respect to the MPU 12 via the DSP 16. Based on an environmental temperature within the optical disk unit detected by the temperature sensor 36, the MPU 12 controls the light emission powers for the read, write and erase in the laser diode control circuit 22.

The MPU 12 controls a spindle motor 40 provided in the enclosure 11 via the DSP 16 and a driver 38. In this embodiment, since the ZCAV system is employed as the recording format of the optical disk, the spindle motor 40 is rotated at a constant speed of 3637 rpm, for example.

In addition, the MPU 12 controls an electromagnet 44 provided in the enclosure 11 via the DSP 16 and a driver 42. The electromagnet 44 is arranged on a side opposite to the side of the optical disk on which the laser beam is irradiated within the optical disk unit which is loaded with this optical disk. This electromagnet 44 supplies an external magnetic field on the optical disk at the time of the recording and erasure. In the case of the optical disk having the 1.3 GB format employing the MSR, the electromagnet 44 also supplies the external magnetic field on the optical disk at the time of the MSR reproduction.

The DSP 16 is provided with a servo function for positioning the laser beam from the laser diode 30-1 with respect to the optical disk, and functions as a seek controller and an on-track controller which enable the laser beam to seek a target track and to be positioned on the target track. The seek control and the on-track control may be carried out simultaneously in parallel with the write access or the read access of the MPU 12 with respect to a host command.

In order to realize the servo function of the DSP 16, a focus error signal (FES) detector 45 is provided in the optical unit of the enclosure 11 so as to detect the laser beam emitted from the laser diode 30-1 and returned via the optical disk. A FES detection circuit 46 generates a FES E1 from a detection signal received from the FES detector 45, and inputs this FES E1 to the DSP 16.

A tracking error signal (TES) detector 47 is also provided in the optical unit of the enclosure 11 so as to detect the laser beam emitted from the laser diode 30-1 and returned via the optical disk. A TES detection circuit 48 generates a TES E2 from a detection signal received from the TES detector 47, and inputs this TES E2 to the DSP 16. The TES E2 is also input to a track zero crossing (TZC) detection circuit 50, and this TZC detection circuit 50 generates a TZC signal E3 which is input to the DSP 16.

A lens position sensor 54 is provided in the enclosure 11. This lens position sensor 54 detects a position of an object lens through which the laser beam is irradiated on the optical disk. A lens position detection signal (LPOS) E4 from the lens position sensor 54 is input to the DSP 16. The DSP 16 controls and drives a focus actuator 60, a lens actuator 64 and a voice coil motor (VCM) 68 via corresponding drivers 58, 62 and 66, so as to control the position of a beam spot formed by the laser beam on the optical disk.

Figure 2:
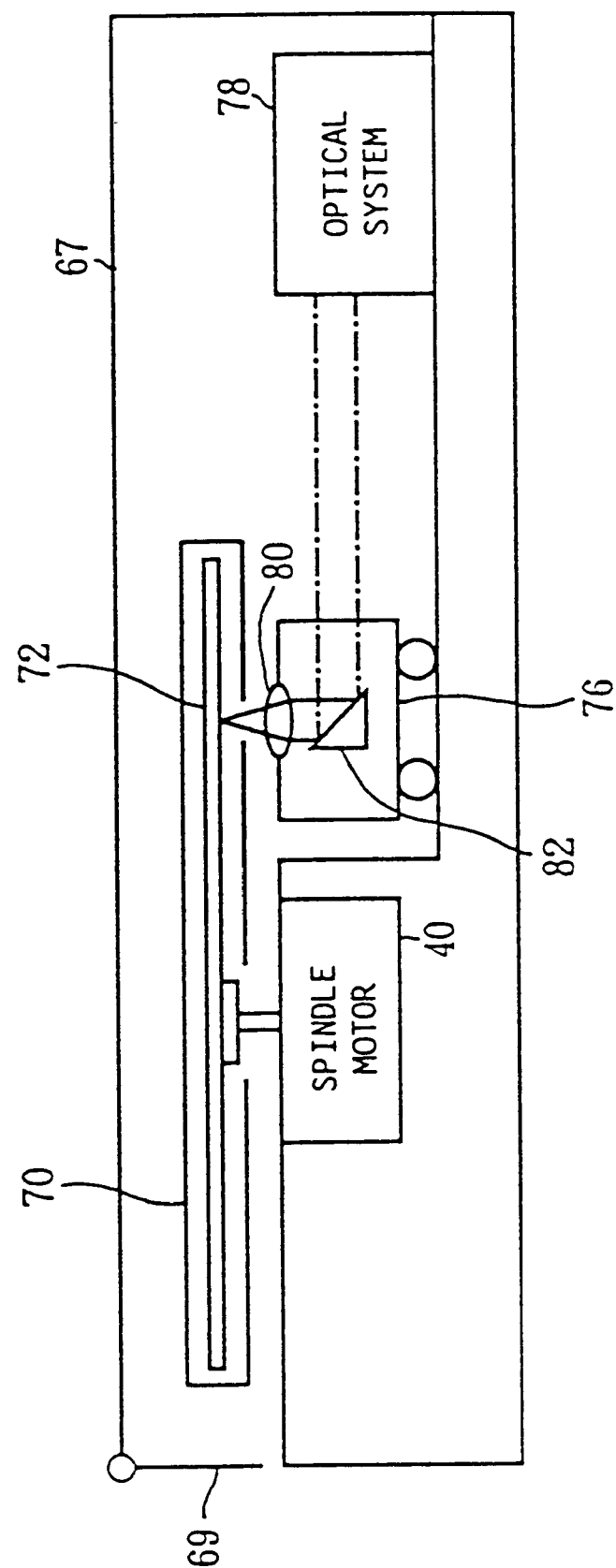
FIG. 2 is a cross sectional view showing the general construction of an enclosure.

FIG. 2 is a cross sectional view showing the general construction of the enclosure 11. As shown in FIG. 2, the spindle motor 40 is provided within a housing 67. By inserting a MO cartridge 70 into the housing 67 from the side of an inlet door 69, an optical disk (MO disk) 72 accommodated within the MO cartridge 70 engages a rotary shaft of the spindle motor 40, thereby loading the optical disk 72 with respect to the optical disk unit.

A carriage 76 is provided below the loaded optical disk 72 within the MO cartridge 70. This carriage 76 is freely movable in a direction which traverses tracks on the optical disk 72 when driven by the VCM 64. An objective lens 80 is mounted on the carriage 76. The laser beam emitted from the laser diode 30-1 which is provided within a fixed optical system 78 is reflected by a mirror 82, and is irradiated on the recording surface of the optical disk 72 via the objective lens 80, thereby forming a beam spot on the recording surface.

The movement of the objective lens 80 along an optical axis is controlled by the focus actuator 60 of the enclosure shown in FIG. 1. In addition, the objective lens 80 is movable in a radial direction which traverses the tracks on the optical disk 72 by the lens actuator 64, within a range of several tens of tracks. The position of the objective lens 80 mounted on the carriage 76 is detected by the lens position sensor 54 shown in FIG. 1. The lens position sensor 54 outputs the lens position detection signal E4 which takes a value zero at a neutral position where the optical axis of the objective lens 80 is perpendicular to the recording surface of the optical disk 72, and has a magnitude and a polarity depending on the amount the optical axis of the objective lens 80 moves towards the inner or outer peripheral side of the optical disk 72.

Since the ZCAV system is employed, the optical disk 72 is divided into a plurality of zones in the radial direction thereof. In the normal mode, the optical disk 72 is rotated at a constant rotational speed by the spindle motor 40, and the recording and/or reproducing reference clock has the same frequency within each of the zones. In addition, the frequency of the recording and/or reproducing clock is set higher for the outer peripheral side of the optical disk 72 than the inner peripheral side of the optical disk 72. In this embodiment, this optical disk 72 is divided into a number of areas less than or equal to the number of zones, from the outer peripheral side to the inner peripheral side of the optical disk 72. Furthermore, the spindle motor 40 is controlled so that the rotational speed of the optical disk 72 becomes higher towards the inner peripheral side for every area. In other words, in a high-speed mode, the rotational speed of the optical disk 72 is switched in each area by a number of times such that undesirable effects on the random access performance are suppressed, and the recording and/or reproducing clock and the recording and/or reproducing power in the laser diode control circuit 22 are switched accordingly. Hence, in the normal mode, a high random access performance is obtained because the optical disk 72 which employs the ZCAV system is used in conformance with the ZCAV system. On the other hand, in the high-speed mode, a high data transfer rate is obtained during the recording and/or reproduction with respect to the optical disk 72 because the optical disk 72 which employs the ZCAV system is used in conformance with a kind of ZCLV system.

In the normal mode, the rotational speed of the optical disk 72 is controlled to be constant. On the other hand, the rotational speed of the optical disk 72 is switched and controlled in a plurality of stages.

Figure 4:
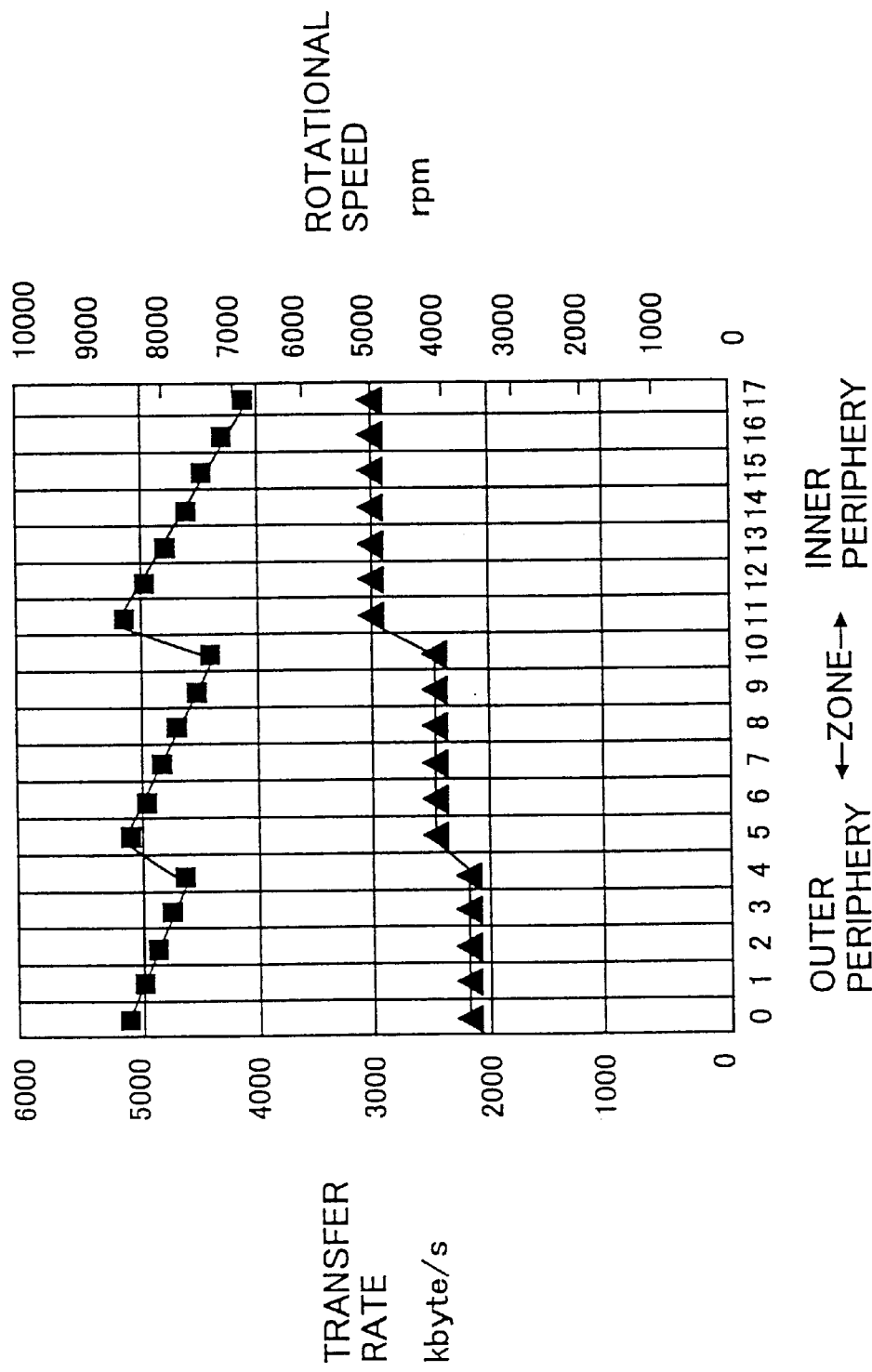
FIG. 4 is a diagram showing the relationships of the data transfer rate and the rotational speed of the optical disk with respect to the zone on the optical disk.

FIG. 3 is a diagram showing the relationships of the zone on the optical disk 72, the data transfer rate and the rotational speed of the optical disk 72. For the sake of convenience, FIG. 3 shows a case where one area is made up of zone units, but as described above, the relationship between the area and the zone is not limited to that shown in FIG. 3. In addition, FIG. 4 is a diagram showing the relationships of the data transfer rate and the rotational speed of the optical disk 72 with respect to the zone on the optical disk 72. In FIG. 4, a rectangular mark indicates the data transfer rate, and a triangular mark indicates the rotational speed of the optical disk 72. FIGS. 3 and 4 show the relationships for a case where the optical disk 72 has a storage capacity of 1.3 GB and the rotational speed of the optical disk 72 can be switched among three rotational speeds in the high-speed mode. Furthermore, it is assumed for the sake of convenience that a zone 0 is located on the outer peripheral side of the optical disk 72 and a zone 17 is located on the inner peripheral side of the optical disk 72.

In the high-speed mode, in the zone 17 located at the innermost peripheral side of the optical disk 72, for example, the rotational speed of the optical disk 72 is switched to 5001 rpm, and the data transfer rate is 4097 Kbyte/s. In the normal mode, the rotational speed is 3637 rpm and the data transfer rate is 2979 Kbyte/s in the zone 17, and it may be seen that the data transfer rate is improved in the high-speed mode. Accordingly, it is possible to obtain a desired data transfer rate on the order of approximately 3700 to 3800 Kbyte/s. In this embodiment, the upper limit of the data transfer rate is restricted to 5121 Kbyte/s or less due to a limit frequency of the circuit, and for this reason, it is not possible to operate at the rotational speed of 5001 rpm in the zones 0 through 10 located on the outer peripheral side of the zone 11. However, the rotational speeds and the data transfer rates which are switched are of course not limited to those shown in FIGS. 3 and 4, and the number of switchable rotational speeds is not limited to three.

In the case of a continuous data such as video and music data amounting to a large amount of data, the video or music stops during the recording and/or reproduction to generate an image distortion, frame dropout and the like, unless the data transfer rate is maintained over a reference value. The data transfer rate during the recording and/or reproduction of a digital video (DV) format is 3700 to 3800 Kbyte/s, and the image and sound becomes discontinuous if the data transfer rate is lower than this data transfer rate range. In the case shown in FIG. 3, the data transfer rate is lower than 3700 Kbyte/s on the inner peripheral side of the zones 12 through 17 when the rotational speed is 3637 rpm, and it may be seen that this data transfer rate is not suited for the recording and/or reproduction of the continuous data such as the video and music data amounting to the large amount of data. Hence, the rotational speed is switched to 5001 rpm, so that the data transfer rate of 3700 to 3800 Kbyte/s is guaranteed from the inner peripheral side to the outer peripheral side of the optical disk 72. Because of the limit frequency of the circuit, it is not possible to set the rotational speed to 5001 rpm or higher at all areas on the optical disk 72, and for this reason, an area where the rotational speed is set to 4138 rpm is also provided on the optical disk 72. In this manner, the rotational speed of the optical disk 72 is changed depending on the area, so that the data transfer rate becomes 3700 to 3800 Kbyte/s or greater at all areas from the inner peripheral side to the outer peripheral side of the optical disk 72.

Figure 5:
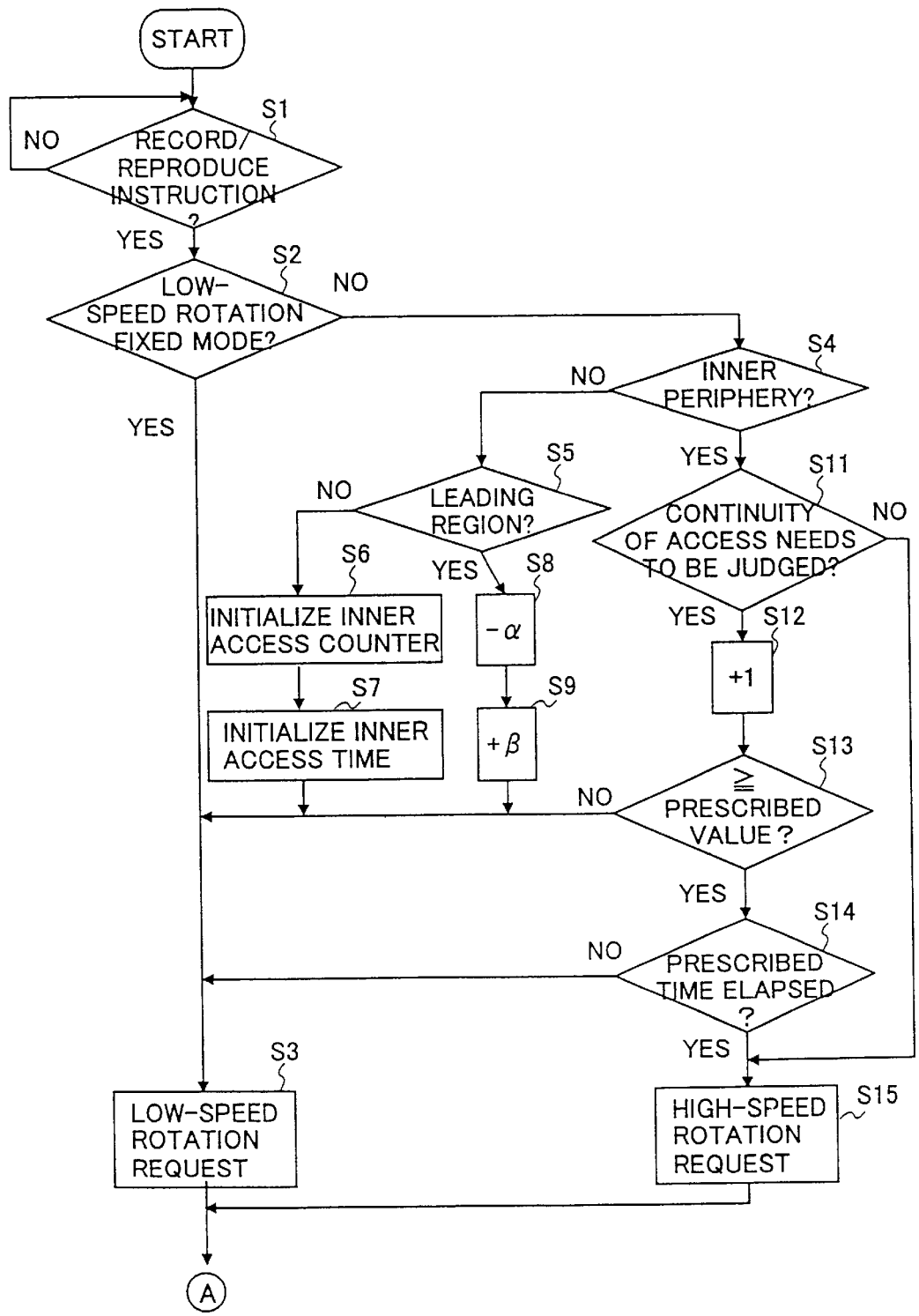
FIG. 5 is a flow chart for explaining the operation of a MPU of the first embodiment.
Figure 6:
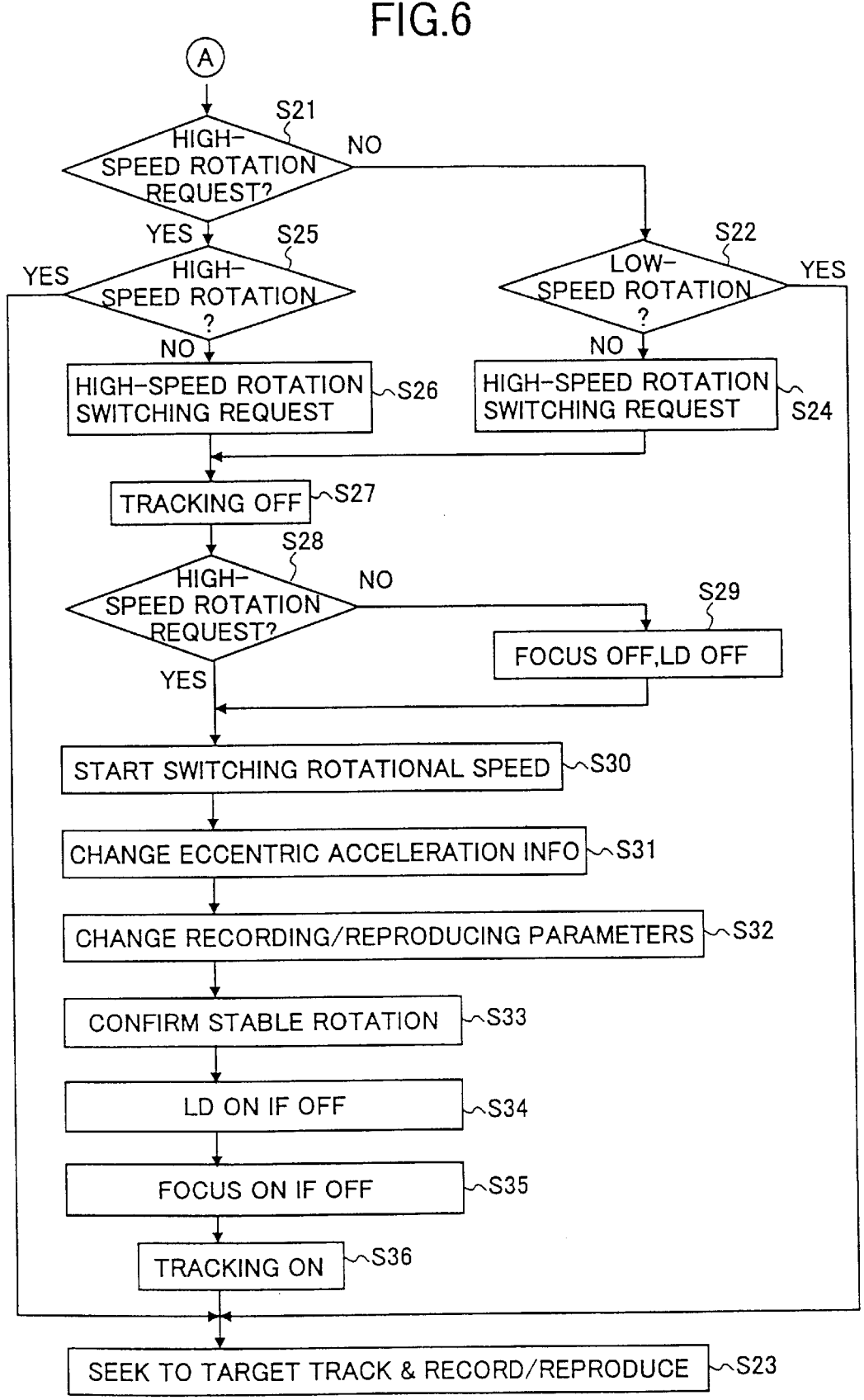
FIG. 6 is a flow chart for explaining the operation of the MPU of the first embodiment.

FIGS. 5 and 6 are flow charts for explaining the operation of the MPU 12 of this embodiment.

In FIG. 5, a step S1 decides whether or not a recording or reproducing instruction is issued from the host unit. If the decision result in the step S1 is YES, a step S2 decides whether or not a normal mode, that is, a low-speed rotation fixed mode of the ZCAV system, is instructed. If the decision result in the step S2 is YES, a step S3 sets a low-speed rotation request, and the process advances to a step S21 shown in FIG. 6 which will be described later.

On the other hand, if the decision result in the step S2 is NO, a kind of mode of the ZCLV system is instructed, and thus, a step S4 decides whether or not the present recording or reproducing position is located at a position recordable or reproducible in the high-speed mode, that is, whether or not the present recording or reproducing position is located on the inner peripheral side of a position where a high-speed rotation is possible. If the decision result in the step S4 is NO, a step S5 decides whether or not the present recording or reproducing position is on the outermost peripheral side of the optical disk 72, that is, in a vicinity of a leading region of the optical disk 72. If the decision result in the step S5 is NO, a step S6 initializes an inner access counter within the MPU 12, a step S7 initializes an inner access time managed within the MPU 12, and the process advances to the step S3. In addition, if the decision result in the step S5 is YES, a step S8 decreases a value of the inner access counter by α, a step S9 increases a value of the inner access time by β, and the process advances to the step S3.

Therefore, in the leading region of the optical disk 72, the conditions for judging continuity of the access is relaxed, so that the rotational speed increases more easily. Regions for managing a state of use of the files, such as a FAT region and a directory region, are provided in the leading region of the optical disk 72. Even when the host unit carries out a sequential process with respect to a region on the inner peripheral side of the optical disk 72, an access to the leading region is generated since the directory region is occasionally updated in order to update or add the file information. Accordingly, by relaxing the conditions for judging the continuity of the access, even if the rotational speed decreases due to the updating of only the directory information during the sequential process, the rotational speed increases before the random access so as to prevent the random access performance from deteriorating.

If the decision result in the step S4 is YES, a step S11 decides whether or not the continuity of the access needs to be judged. The process advances to a step S15 which will be described later if the decision result in the step S11 is NO. ON the other hand, if the decision result in the step S11 is YES, a step S12 increments the inner access counter by one, and a step S13 decides whether or not the value of the inner access counter is greater than or equal to a prescribed value. The process advances to the step S3 if the decision result in the step S13 is NO, and the process advances to a step S14 if the decision result in the step S13 is YES. The step S14 decides whether or not a prescribed time has elapsed from a last outer access which is made in a low-speed mode, and the process advances to the step S3 if the decision result in the step S14 is NO. If the decision result in the step S14 is YES or the decision result in the step S11 is NO, the step S15 sets a high-speed rotation request for recording or reproducing in the high-speed mode, and the process advances to the step S21 shown in FIG. 6.

In particular, it is judged whether there is a continuity of access from an arbitrary area to an area located on an inner peripheral side of the recording medium relative to the arbitrary area during the normal mode. The rotational speed is switched to the second rotational speeds only when the continuity of access is judged.

The prescribed time described above is set so that the rotational speed of the optical disk 72 which once decreases does not easily increase again, to thereby prevent deterioration of the random access performance and the decrease of the data transfer rate which would otherwise occur if the rotational speed were frequently switched.

In FIG. 6, the step S21 decides whether or not the high-speed rotation request exists, and the process advances to a step S22 if the decision result in the step S21 is NO. The step S22 decides whether or not the present mode is the normal mode, that is, the optical disk 72 is undergoing low-speed rotation. If the decision result in the step S22 is YES, a step S23 carries out a seek to a target track on the optical disk 72, to carry out a recording or reproduction. If the decision result in the step S22 is NO, a step S24 sets a low-speed rotation switching request, and the process advances to a step S27 which will be described later.

If the decision result in the step S21 is YES, a step S25 decides whether or not the present mode is the high-speed mode, that is, the optical disk 72 is undergoing a high-speed rotation. The process advances to the step S23 if the decision result in the step S21 is YES. If the decision result in the step S25 is NO or after the step S24, the step S27 turns OFF the tracking servo based on the TES E2. A step S28 decides whether or not the high-speed rotation request exists. If the decision result in the step S28 is NO, a step S29 turns OFF the focus servo based on the FES E1, and turns OFF the laser diode 30-1, in order to prevent the data on the optical disk 72 from being destroyed. If the decision result in the step S28 is YES or after the step S29, a step S30 starts switching of the rotational speed. The switching of the rotational speed may be carried out based on a table which indicates the relationships shown in FIG. 3, for example, by storing the table in the memory 18, for example.

A step S31 changes eccentric acceleration information depending on the new rotational speed of the optical disk 72 after the switching of the rotational speed. The eccentric acceleration information is changed by replacing contents (eccentric acceleration information) of an eccentric acceleration table within the memory 18, for example, or by recalculating the eccentric acceleration information, depending on the new rotational speed. The eccentric acceleration information relates to the acceleration which is generated due to the eccentricity of the optical disk 72, and will be described later. A step S32 changes various recording or reproducing parameters which are used during the recording or reproduction, depending on the new rotational speed. A step S33 confirms the stabilized rotation of the optical disk 72. A step S34 turns ON the laser diode 30-1 if the laser diode 30-1 is OFF. A step S35 turns ON the focus servo if the focus servo is OFF. In addition, a step S36 turns ON the tracking servo if the tracking servo is OFF, and the process advances to the step S23.

By the operation described above, it is possible to carry out a process (1) which switches and sets between the low-speed rotation fixed mode and the rotational speed switching mode, and a process (2) which switches and sets whether or not to judge the continuity of the access in the rotational speed switching mode. The process (1) can be carried out by setting a flag which is used for the decision in the step S2 shown in FIG. 5. In addition, the process (2) can be carried out by setting a flag which is used for the decision in the step S11 shown in FIG. 5 in a state where the process (1) sets the rotational speed switching mode. Methods of setting these flags are not limited to specific methods. For example, a method which sets the mode from the host unit, a method which sets the mode in a nonvolatile memory within the memory 18, and a method which writes mode setting information on the optical disk 72 from the host unit and sets the mode based on the written mode setting information may be used to set these flags.

Figure 8:
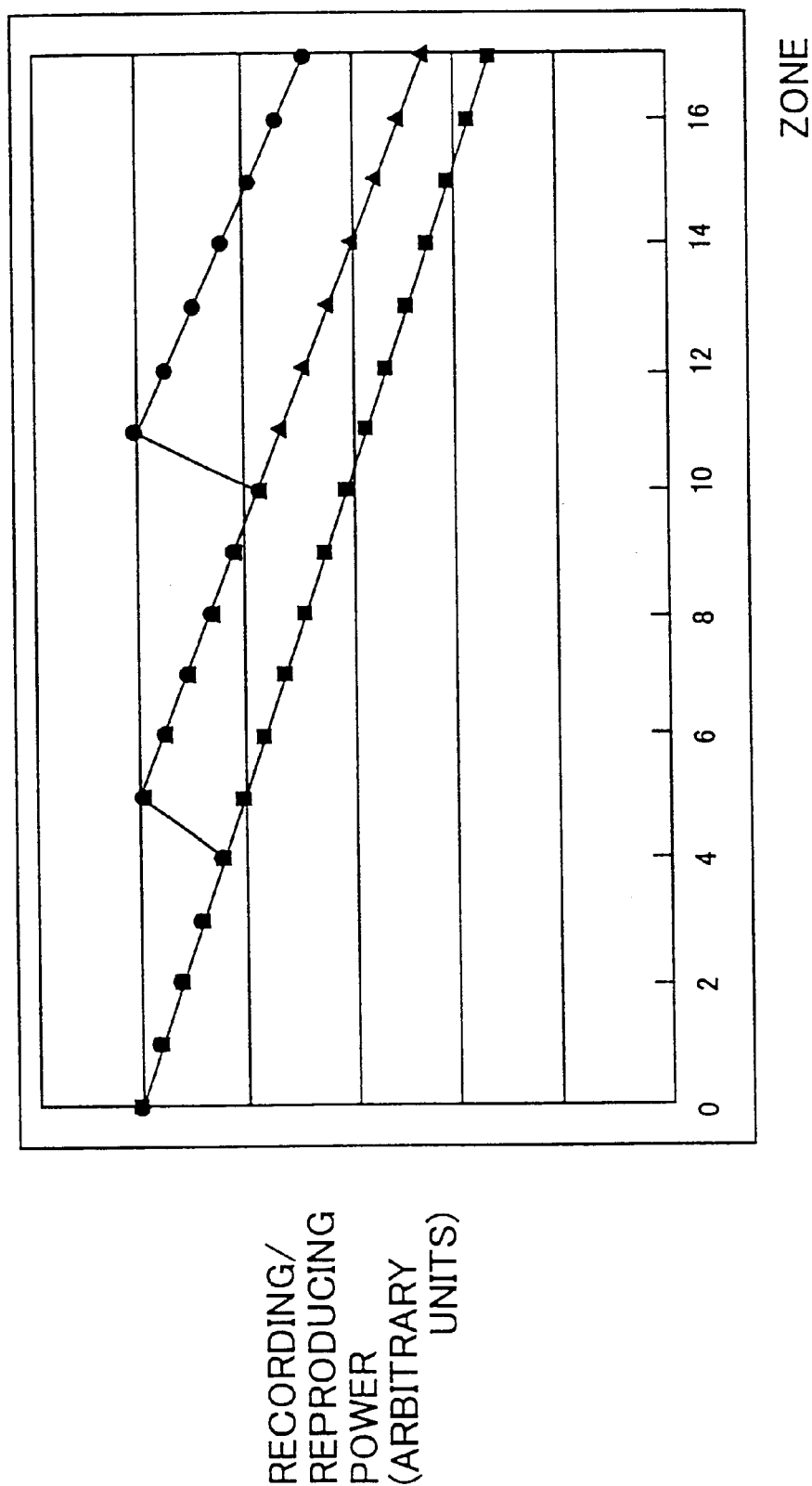
FIG. 8 is a diagram showing the relationships of the zone on the optical disk, a recording or reproducing power and the rotational speed of the optical disk.

The recording or reproducing parameters set in the step S32 shown in FIG. 6 include the recording or reproducing clock frequency and the recording or reproducing power of the laser diode 30-1. FIGS. 7 and 8 are diagrams for explaining the recording or reproducing parameters which are changed.

FIG. 7 is a diagram showing the relationships of the zone on the optical disk 72, the recording or reproducing clock frequency and the rotational speed of the optical disk 72. In FIG. the unit of the recording or reproducing clock frequency is MHz.

FIG. 8 is a diagram showing the relationships of the zone on the optical disk 72, the recording or reproducing power and the rotational speed of the optical disk 72. In FIG. 8, a rectangular mark indicates a case where the rotational speed is 3637 rpm, a triangular mark indicates a case where the rotational speed is 4138 rpm, and a circular mark indicates a case where the rotational speed is 5001 rpm.

For example, as proposed in a Japanese Laid-Open Patent Application No.11-73669, a test write obtains an error quantity of an optimum recording or reproducing power with respect to a default recording or reproducing power of a power default table, so as to optimize the recording or reproducing power. For this reason, this embodiment does not need to carry out the test write every time the rotational speed is switched. In other words, when the rotational speed is switched, it is only necessary to switch the power default table corresponding to each rotational speed, and the optimum recording or reproducing power at each rotational speed can be optimized by correcting the default recording or reproducing power of the corresponding power default table by the same error quantity.

Furthermore, this embodiment can minimize the processing time, because the process of changing the parameters dependent on the rotational speed of the optical disk 72, such as the eccentric acceleration information and the recording or reproducing parameters, is carried out in parallel with the process of switching the rotational speed.

Figure 9:
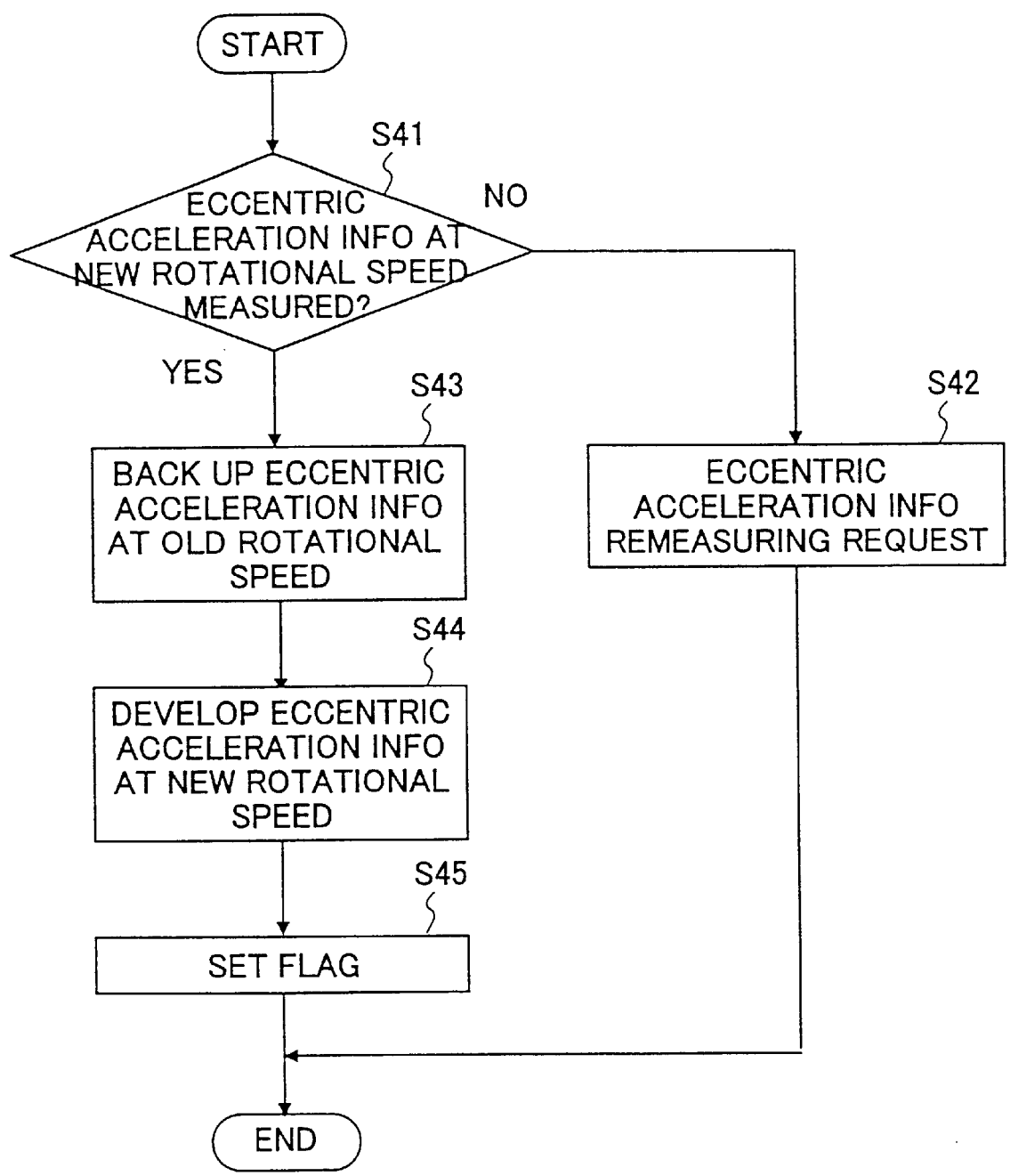
FIG. 9 is a flow chart for explaining an eccentric acceleration information switching process.

FIG. 9 is a flow chart for explaining an eccentric acceleration information switching process of the step S31 shown in FIG. 6. In this embodiment, it is assumed for the sake of convenience that the eccentric acceleration information switching process is carried out by the DSP 16 under the control of the MPU 12. In FIG. 9, a step S41 decides whether or not the eccentric acceleration information at the new rotational speed of the optical disk 72 is already measured in the past. If the decision result in the step S41 is NO, a step S42 sets an eccentric acceleration information remeasuring request, and the process ends. Hence, the eccentric acceleration information at the new rotational speed is measured by a known method and is stored in the eccentric acceleration table. For example, methods of measuring and learning the eccentric acceleration information are proposed in a Japanese Laid-Open Patent Application No.2000-339729.

On the other hand, if the decision result in the step S41 is YES, a step S43 provides a backup for the eccentric acceleration information corresponding to the old rotational speed and stored in the memory within the DSP 16 or in the memory 18. A step S44 develops the eccentric acceleration information corresponding to the new rotational speed in the memory within the DSP 16 or in the memory 18. A step S45 sets a flag with respect to the eccentric acceleration information corresponding to the old rotational speed, and the process ends.

The eccentric acceleration information changes when the rotational speed of the optical disk 72 changes, and thus, it is necessary to obtain the eccentric acceleration information depending on the rotational speed. Because it takes time to measure and store the eccentric acceleration information, it is desirable not to carry out the process of remeasuring the eccentric acceleration information as much as possible when the rotational speed is switched. Hence, this embodiment decides whether or not the eccentric acceleration information corresponding to the new rotational speed is already measured, and if in the affirmative, this embodiment merely replaces the contents of the eccentric acceleration table, so as to minimize the processing time by omitting the remeasuring process.

Figure 10:
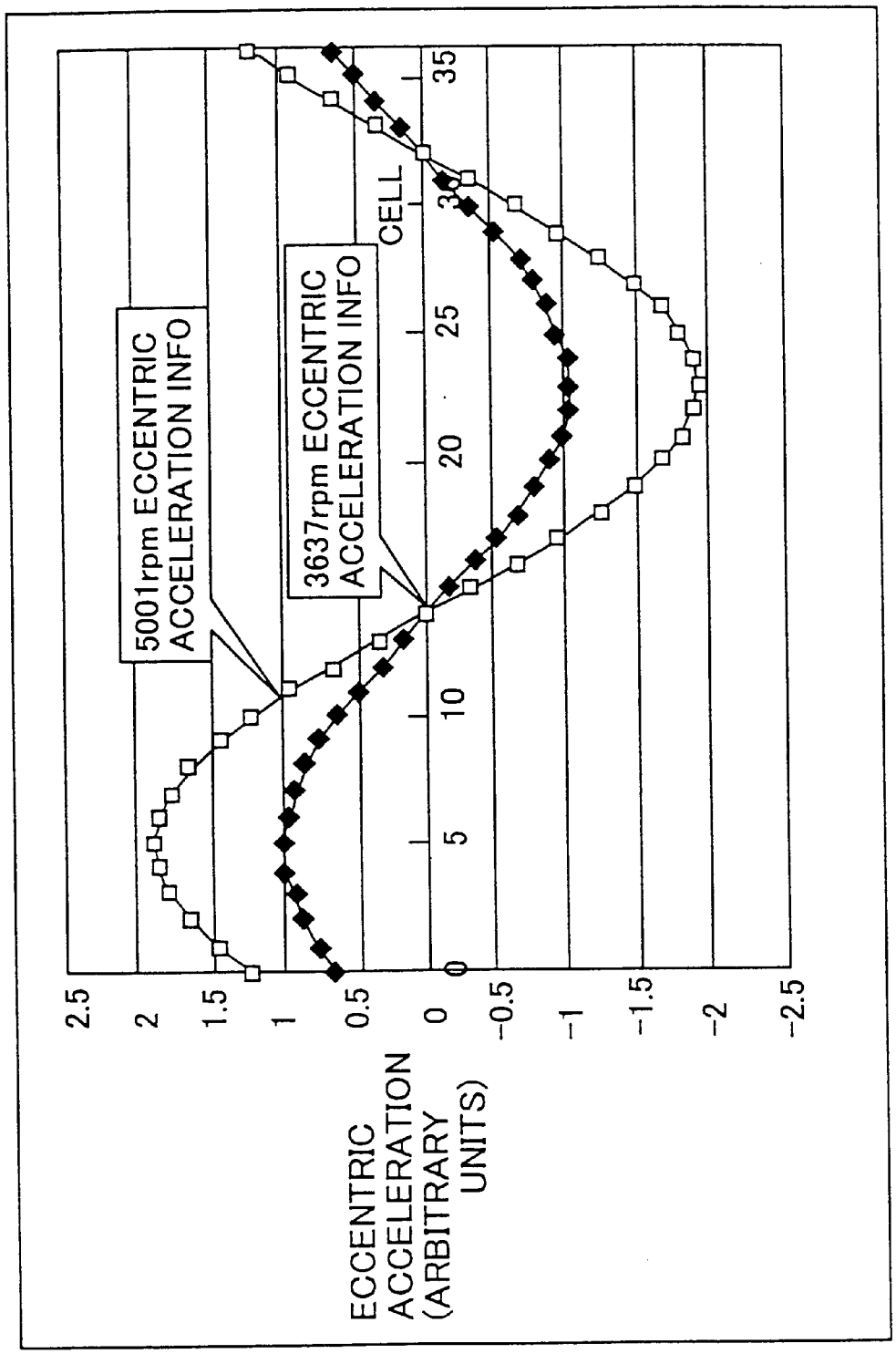
FIG. 10 is a diagram for explaining the eccentric acceleration information switching process.

FIG. 10 is a diagram for explaining the eccentric acceleration information switching process of the step S31 shown in FIG. 6. More particularly, FIG. 10 is a diagram for explaining a case where the eccentric acceleration information is switched by calculation. In FIG. 10, the ordinate indicates the eccentric acceleration in arbitrary units, and the abscissa indicates a memory cell number in the memory within the DSP 16 or in the memory 18. In addition, a rectangular mark indicates the eccentric acceleration corresponding to a case where the rotational speed is 5001 rpm, and a diamond mark indicates the eccentric acceleration corresponding to a case where the rotational speed is 3637 rpm.

In the DSP 16, a reference signal indicating one rotation of the optical disk 72 is generated based on a signal obtained via the read LSI circuit 24 and the ODC 14. This reference signal maintains the relationship with respect to a position along a circumferential direction of the optical disk 72 even when the rotational speed of the optical disk 72 changes. Accordingly, the DSP 16 calculates the eccentric acceleration information (eccentric acceleration transition) amounting to one rotation based on the reference signal, and successively stores the eccentric acceleration information in the memory cell numbers of the memory within the DSP 16 or within the memory 18. For the sake of convenience, FIG. 10 shows a case where the eccentric acceleration information of the eccentric acceleration table corresponding to the rotational speed of 5001 rpm is calculated from the eccentric acceleration information of the eccentric acceleration table corresponding to the rotational speed of 3637 rpm. Accordingly, the eccentric acceleration in this case becomes $(5001/3637)^2$ times when the rotational speed of the optical disk 72 changes, and an eccentric acceleration table is calculated in which the eccentric acceleration information stored in the memory cell numbers is multiplied by $(5001/3637)^2$. Furthermore, since the elapsed time corresponding to one memory cell is multiplied by $(3637/5001)$, if an updating time of the memory cells for the case where the rotational speed is 3637 rpm is denoted by 1, the parameters are set with respect to the DSP 16 so that the memory cells are updated $1 \times (3637/5001)$ at a time for the case where the rotational speed is 5001 rpm.

Therefore, according to this embodiment, it is possible to an optimum random access performance or data transfer rate depending on the needs, by switching the table of the recording or reproducing parameters, such as the recording or reproducing clock frequency, the recording or reproducing power and the eccentric acceleration information, when the rotational speed of the optical disk 72 is switched.

Next, a description will be given of a second embodiment of the storage apparatus according to the present invention, by referring to FIG. 11. The construction of this second embodiment of the storage apparatus is the same as the construction of the first embodiment shown in FIGS. 1 and 2, and an illustration thereof will be omitted. In this second embodiment of the storage apparatus, the present invention is applied to an optical disk unit. In addition, this second embodiment of the storage apparatus employs a second embodiment of the rotation control method for recording medium according to the present invention.

FIG. 11 is a diagram for explaining a buffer region provided on the optical disk 72 in this second embodiment. As indicated by a rectangular surrounding mark in FIG. 11, the buffer region may be provided at a boundary portion of the optical disk 72 between a region which is accessible in the normal mode and a region which is accessible in the high-speed mode. In this case, when an access request to the region which is accessible in the high-speed mode is generated in the normal mode, it is detected that the access is generated with respect to the region located on the inner peripheral side of the buffer region on the optical disk 72, and the optical disk 82 is rotated at the high rotational speed to switch the mode to the high-speed mode. In other words, the operation of the MPU 12 in this case is substantially the same as the operation of the first embodiment, except that the buffer region is recognized.

When an access request to a certain region on the outer peripheral side of the optical disk 72 is generated in the high-speed mode, and this certain region is the buffer region, it is possible not to immediately switch to the normal mode, but to switch to the normal mode when an access request to a region on the outer peripheral side of the buffer region is generated. In addition, when an access request to a region of the optical disk 72 accessible in the high-speed mode is generated, it is possible not to immediately switch the rotational speed of the optical disk 72 to the high rotational speed, but to measure the state of the access and to switch the rotational speed to the high rotational speed only when an access to a region located on the inner peripheral side of the buffer region of the optical disk 72 is consecutively generated. Moreover, when an access request to a region on the outer peripheral side of the optical disk 72 is generated during access to a region on the inner peripheral side of the optical disk 72 in the high-speed mode, it is also possible to immediately switch the rotational speed of the optical disk 72 to the rotational speed of the region on the outer peripheral side of the optical disk 72.

Accordingly, by providing the buffer region on the optical disk 72 and switching the rotational speed of the optical disk 72 in a hysteresis manner, frequent occurrences of the consecutive access and switching of the rotational speed can be suppressed, so that it is possible to prevent deterioration of the random access performance and the data transfer rate.

As a modification of the first or second embodiment described above, it is possible to disable the mode switching operation, so that the mode is fixed to the normal mode or the high-speed mode. In this case, the MPU 12 can disable the mode switching operation in response to a mode fixing request from the host unit. The mode may be fixed to the normal mode when using an optical disk which only supports the normal mode, or when using an optical disk which is primarily used for random access. On the other hand, the mode may be fixed to the high-speed mode when processing continuous data such as music and video data amounting a large amount of data, or when the optical disk primarily needs to be used at a high data transfer rate.

Such a mode fixing request may be generated based on an instruction from the user who uses the host unit or, generated by linking with an application software of the host unit. A flag of the mode fixing request may be set in a nonvolatile memory within the memory 18. In addition, the flag of the mode fixing request may be managed together with a flag which indicates whether or not the continuity of the access needs to be judged. For example, in the following cases A through C, "0" indicates an invalid state and "1" indicates a valid state of each of the three kinds of flags.

| Flag | Case A | Case B | Case C |
| --- | --- | --- | --- |
| Fix to Normal Mode | 1 | 0 | 0 |
| Fix to High-Speed Mode | 0 | 1 | 1 |
| Judge Access Continuity | 0 | 0 | 1 |

The case A is suited for situations ① through ④ described below. In a situation ①, the user does not desire a high data transfer rate. In a situation ②, the user wishes to secure reliability of the recording or reproduction. In a situation ③, the optical disk used has a storage capacity of 128 MB to 640 MB (a situation where the recording or reproduction is possible from the inner peripheral side to the outer peripheral side of the optical disk by fixing the rotational speed to a constant rotational speed of 5400 rpm, because the recording or reproducing clock can be generated without problem circuitwise even when the rotational speed is 4600 to 5400 rpm). In a situation ④, the compatibility of the optical disk and the optical disk unit is poor due to inconsistencies introduced during production stage of the optical disk and/or the optical disk unit, and an error and a retry associated therewith are generated at high frequency, and the rotational speed of the optical disk is controlled to be constant in order to secure the reliability of the optical disk unit. In the situation ④, the optical disk is controlled to a low-speed rotation of approximately 3600 rpm in the case of the optical disk having the storage capacity of 1.3 GB. In a case where the flag is set to fix the mode to the high-speed mode, the optical disk unit itself or the user resets the flag so as to fix the mode to the normal mode.

The case B is suited for situations ① and ② described below. In the situation ①, the user desires a high data transfer rate regardless of the kind of data to be processed such as the video and music data. In the situation ②, a predetermined data transfer rate is requested in order to process continuous data such as video and music data amounting to a large amount of data. In the case of an optical disk unit exclusively for processing the data such as the video and music data, the flag may be preset to fix the mode to the high-speed mode when forwarding the optical disk unit.

The case C is suited for the situations ① and ② of the case B, and for the following situation ③. In the situation ③, the user wishes to process not only the data of the host unit such as the personal computer, but also the continuous data such as the video and music data amounting to a large amount of data. In this case, in order to suit the various needs of the user, the flags may be set by the user or the optical disk unit itself to fix the mode to the high-speed mode and to indicate that the continuity of the access needs to be judged.

In each of the embodiments described above, the mode is switched and set between the high-speed mode and the normal mode, based on a table corresponding to the tables shown in FIGS. 3, 7 and 11, when the recognized type of the optical disk has the storage capacity of 128 MB, 230 MB, 540 MB 640 MB or 1.3 GB, for example. However, in a case where the optical disk unit is constructed to be compatible with optical disks other than the magneto-optical disk, such as the DVD-RAM employing the CAV or ZCAV system, it is possible to switch and set the mode between the high-speed mode and the normal mode based on the type of optical disk other than the storage capacity of the optical disk. Furthermore, if a mode identification flag is recorded on the optical disk itself, it is possible to identify this optical disk as a medium to be fixedly used in the normal mode even when the storage capacity of this optical disk is 1.3 GB, for example.

Figure 12:
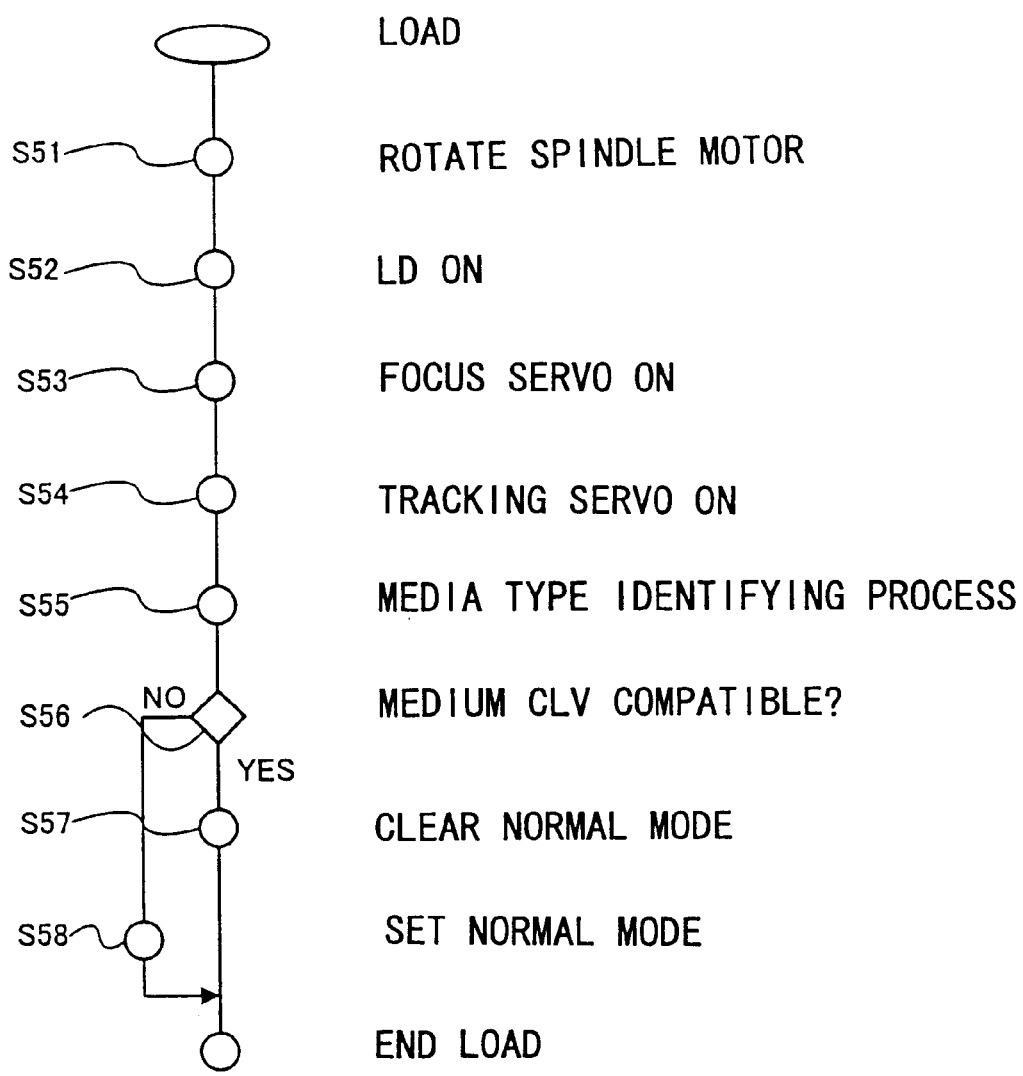
FIG. 12 is a flow chart for explaining a mode setting process depending on the type of optical disk which is loaded.

FIG. 12 is a flow chart for explaining a mode setting process depending on the type of optical disk 72 which is loaded. The mode setting process shown in FIG. 12 is carried out by the MPU 12. In FIG. 12, when a loading process is started to load the optical disk 72 into the optical disk unit, a step S51 rotates the spindle motor 40, and a step S52 turns the laser diode 30-1 ON to emit the laser light therefrom. A step S53 turns the focus servo ON, and a step S54 turns the tracking servo ON. A step S55 carries out a media type identifying process. In this embodiment, the type of the optical disk 72 is identified by reading the ID signal. A step S56 decides whether or not the optical disk 72 is a medium usable under the CLV system, based on the identified media type of the optical disk 72. If the decision result in the step S56 is YES, a step S57 clears the setting of the normal mode, and the loading process ends. On the other hand, if the decision result in the step S56 is NO, a step S58 sets the mode to the normal mode, and the loading process ends.

Furthermore, the switching and setting of the mode between the high-speed mode and the normal mode may be made depending on the number of errors generated or the contents of the error during the read or write process.

Figure 13:
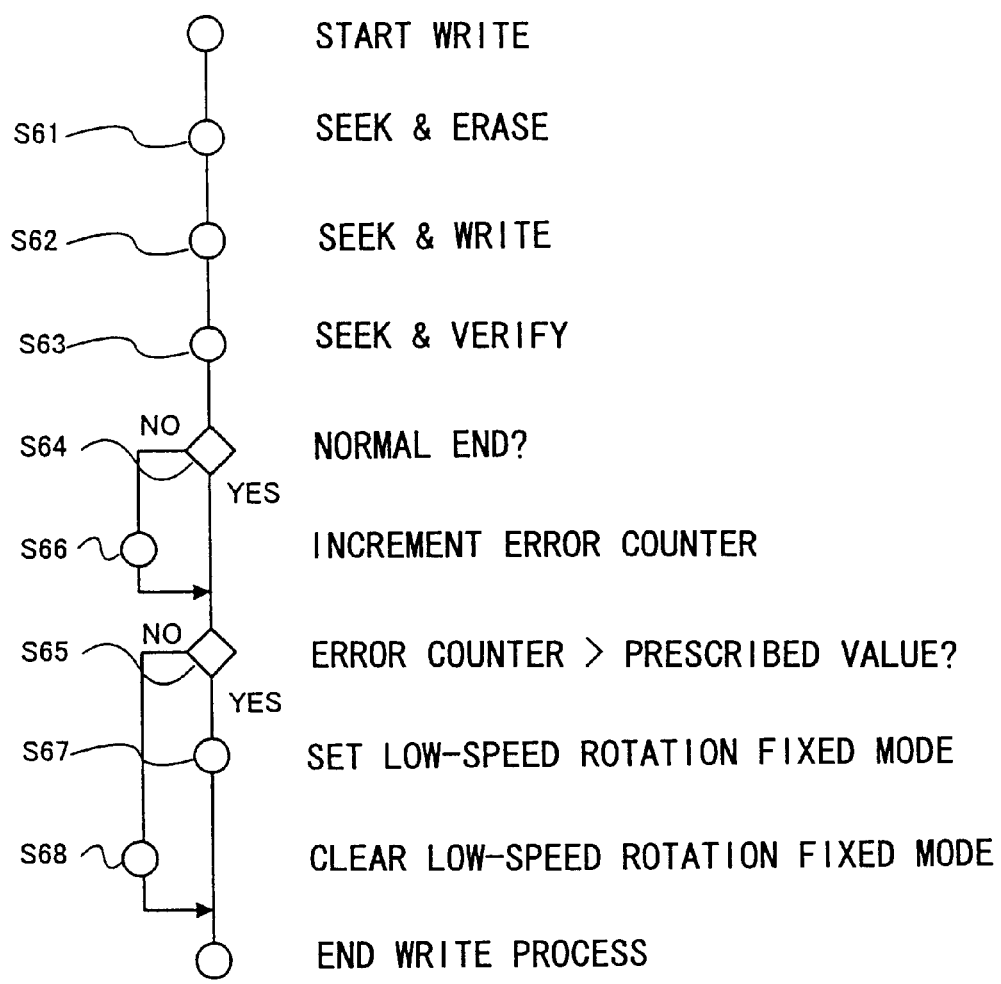
FIG. 13 is a flow chart for explaining a mode setting process depending on a number of errors.

FIG. 13 is a flow chart for explaining a mode setting process depending on the number of errors. The mode setting process shown in FIG. 13 is carried out by the MPU 12. For the sake of convenience, a description will be given of the mode setting process for the write process, but it is of course possible to carry out the mode setting process similarly for the read process.

In FIG. 13, when the write process is started, a step S61 carries out a seek and erase process, a step S62 carries out a seek and write process, and a step S63 carries out a seek and verify process. A step S64 decides whether or not the processes of the steps S61 through S63 ended normally. If the decision result in the step S64 is YES, the process advances to a step S65. On the other hand, if the decision result in the step S64 is NO, a step S66 increments a value of an internal error counter of the MPU 12 by one, and the process advances to the step S65.

The step S65 decides whether or not the value of the error counter is greater than a prescribed value. If the decision result in the step S65 is YES, a step S67 sets the mode to the low-speed rotation fixed mode, and the write process ends. On the other hand, if the decision result in the step S65 is NO, a step S68 clears the setting of the low-speed rotation fixed mode, and the write process ends.

In the embodiments described above, the present invention is applied to an optical disk unit which uses a magneto-optical disk. However, the present invention is of course similarly applicable to apparatuses which use disk-shaped recording media such as phase-change type optical disks and magnetic disks. In addition, the shape of the recording medium is not limited to the disk-shape, and the recording medium may have a card-shape or the like with a spiral track or concentric tracks formed similarly to the optical disk of the above described embodiments.

Further, the present invention is not limited to these embodiments, but various variations and modifications may be made without departing from the scope of the present invention.

What is claimed is:

1. A rotation control method for controlling a recording medium which is divided into a plurality of zones in a radial direction thereof and employing a ZCAV system, said rotation control method comprising the step of:

(a) switching a mode between a normal mode in which the recording medium is controlled to rotate at a first rotational speed, and a high-speed mode in which the recording medium is controlled to rotate at a plurality of second rotational speeds respectively corresponding to a plurality of areas to which the recording medium is divided in the radial direction thereof; and (b) judging a continuity of an access from an arbitrary area to an area located on an inner peripheral side of the recording medium relative to the arbitrary area during the normal mode, said step (a) switching the rotational speed to the second rotational speeds only when said step (b) judges the continuity of the access.

2. The rotation control method as claimed in claim 1, wherein said step (a) switches the mode depending on a type of the recording medium.

3. The rotation control method as claimed in claim 1, further comprising the step of:

(c) changing at least one of a recording or reproducing clock, recording or reproducing power, and eccentric acceleration information, in response to a switching of the rotational speed by said step (a).

4. The rotation control method as claimed in claim 1, wherein said step (b) relaxes conditions for judging the continuity of the access when accessing a region on the recording medium for managing state of use of files.

5. The rotation control method as claimed in claim 1, wherein said step (a) immediately switches the rotational speed to the first rotational speed when accessing an area located on an outer peripheral side of the recording medium relative to the arbitrary area during the high-speed mode.

6. The rotation control method as claimed in claim 1, further comprising the step of:
   (c) turning OFF a laser diode used for recording or reproduction when the rotational speed decreases by the switching of the rotational speed made by said step (a).

7. The rotation control method as claimed in claim 1, wherein said step (a) switches the mode depending on a situation of an access to the recording medium.

8. The rotation control method as claimed in claim 7, wherein said step (a) switches the mode to the high-speed mode when an elapsed time from a last access to an outer peripheral side of the recording medium during the normal mode becomes greater than or equal to a prescribed value.

9. The rotation control method as claimed in claim 1, wherein:
   a buffer region is provided between an arbitrary area on the recording medium and an area located on an inner peripheral side of the recording medium relative to the arbitrary area; and
   said step (a) switches the rotational speed to the second rotational speeds only when accessing an area located on the inner peripheral side of the recording medium relative to the buffer region.

10. A storage apparatus having a function of controlling rotation of a recording medium which is divided into a plurality of zones in a radial direction thereof and employing a ZCAV system, said storage apparatus comprising:
    a setting part to set a mode to one of a normal mode in which the recording medium is controlled to rotate at a first rotational speed, and a high-speed mode in which the recording medium is controlled to rotate at a plurality of second rotational speeds respectively corresponding to a plurality of areas to which the recording medium is divided in the radial direction thereof; and
    a judging part to judge a continuity of an access from an arbitrary area to an area located on an inner peripheral side of the recording medium relative to the arbitrary area during the normal mode,
    said setting part setting the rotational speed to the second rotational speeds only when said judging part judges the continuity of the access.

11. The storage apparatus as claimed in claim 10, wherein said setting part sets the mode depending on a type of the recording medium.

12. The storage apparatus as claimed in claim 10, further comprising:
    a changing part to change at least one of a recording or reproducing clock, recording or reproducing power, and eccentric acceleration information, in response to a setting of the rotational speed by said setting part.

13. The storage apparatus method as claimed in claim 10, wherein said judging part relaxes conditions for judging the continuity of the access when accessing a region on the recording medium for managing state of use of files.

14. The storage apparatus method as claimed in claim 10, wherein said setting part immediately sets the rotational speed to the first rotational speed when accessing an area located on an outer peripheral side of the recording medium relative to the arbitrary area during the high-speed mode.

15. The storage apparatus as claimed in claim 10, further comprising:
    a part to turn OFF a laser diode used for recording or reproduction when the rotational speed decreases by the setting of the rotational speed made by said setting part.

16. The storage apparatus as claimed in claim 10, wherein said setting part sets the mode depending on a situation of an access to the recording medium.

17. The storage apparatus as claimed in claim 16, wherein said setting part sets the mode to the high-speed mode when an elapsed time from a last access to an outer peripheral side of the recording medium during the normal mode becomes greater than or equal to a prescribed value.

18. The storage apparatus as claimed in claim 10, wherein:
    a buffer region is provided between an arbitrary area on the recording medium and an area located on an inner peripheral side of the recording medium relative to the arbitrary area; and
    said setting part sets the rotational speed to the second rotational speeds only when accessing an area located on the inner peripheral side of the recording medium relative to the buffer region.

19. A storage apparatus having a function of controlling rotation of a recording medium which is divided into a plurality of zones in a radial direction thereof and employing a ZCAV system, said storage apparatus comprising:
    a controller to switch and control a rotational speed of the recording medium in a plurality of stages when making an access from an arbitrary one of a plurality of areas to which the recording medium is divided in the radial direction to an area located on an inner peripheral side or an outer peripheral side of the recording medium relative to the arbitrary area, so that a data transfer rate becomes 3700 Kbyte/s or greater when making the access to the area located on the inner peripheral side of the recording medium relative to the arbitrary area; and
    a judging part to judge a continuity of an access from an arbitrary area to an area located on an inner peripheral side of the recording medium relative to the arbitrary area during the normal mode,
    said setting part setting the rotational speed to the rotational speeds respectively corresponding to the plurality of areas only when said judging part judges the continuity of the access.

20. A storage apparatus having a function of controlling rotation of a recording medium which is divided into a plurality of zones in a radial direction thereof and employing a ZCAV system, said storage apparatus comprising:
    control means for setting a mode to one of a normal mode in which the recording medium is controlled to rotate at a first rotational speed, and a high-speed mode in which the recording medium is controlled to rotated at a plurality of second rotational speeds respectively corresponding to a plurality of areas to which the recording medium is divided in the radial direction thereof; and
    a judging means for judging a continuity of an access from an arbitrary area to an area located on an inner peripheral side of the recording medium relative to the arbitrary area during the normal mode,
    said control means setting the rotational speed to the second rotational speeds only when said judging part judges the continuity of the access.

* * * * *